(12) United States Patent
Kitz et al.

(10) Patent No.: US 8,078,762 B2
(45) Date of Patent: Dec. 13, 2011

(54) METHOD FOR TRANSMITTING MEASURED DATA, AND SENSOR DEVICE

(75) Inventors: Rainer Kitz, Nidderau (DE); Murat Ucak, Frankfurt am Main (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 430 days.

(21) Appl. No.: 12/304,176

(22) PCT Filed: Jun. 14, 2007

(86) PCT No.: PCT/EP2007/055918
§ 371 (c)(1),
(2), (4) Date: Dec. 10, 2008

(87) PCT Pub. No.: WO2007/144412
PCT Pub. Date: Dec. 21, 2007

(65) Prior Publication Data
US 2009/0190571 A1 Jul. 30, 2009

(30) Foreign Application Priority Data

Jun. 14, 2006 (DE) .......................... 10 2006 027 997
Jun. 14, 2007 (DE) .......................... 10 2007 028 002

(51) Int. Cl.
*G06F 15/16* (2006.01)
(52) U.S. Cl. ...................... 709/248; 370/350; 370/395.4
(58) Field of Classification Search ................... 709/248; 702/188; 370/350, 395.4; 340/681, 3.2
See application file for complete search history.

(56) References Cited

U.S. PATENT DOCUMENTS

| 7,152,019 B2 * | 12/2006 | Tarantola et al. ............. 702/186 |
| 2002/0103592 A1 | 8/2002 | Gross et al. |
| 2002/0112070 A1 * | 8/2002 | Ellerbrock et al. ........... 709/238 |
| 2006/0106581 A1 * | 5/2006 | Bornhoevd et al. ........... 702/188 |
| 2007/0032933 A1 | 2/2007 | Glaser |
| 2009/0210075 A1 * | 8/2009 | Moriwaki ....................... 700/28 |

FOREIGN PATENT DOCUMENTS

| EP | 1 416 687 A1 | 5/2004 |
| EP | 1 667 376 A1 | 6/2006 |
| GB | 2 418 113 A | 3/2006 |
| WO | WO 2004/101326 A1 | 11/2004 |

OTHER PUBLICATIONS

Suter, J.U., et al.: Using Synchr. FireWire Cameras for Multiple Viewpoint Dig.Video Capcture.Monash Univers. Department of Electr. And Comp. Sys. Engin.Techn.Rep. MECSE-16-2004, Clayton, Victoria, Austr.: Monash Univ., Nov. 10, 2004.
Younis, C., et al: A Scal. Framework for Distrib. Time Synchron. In Multi-hop Sensor Netw.: 2005Sec. Ann. IEEE Comm. Soc. Conf. on Sensor and Ad Hoc Communic. And Networks, Sep. 25-29, 2005, IEEE SECON, 2005.Conf. Proc., S. 13-23; Abstr., Abschn.I,I.A., S.13, 14, Abschn.VI, S.21,22.
Jayasimha, D.N., et al.: Inform.Integr. and Synchroniz,in Distrib. Sen. Networks. In: IEEE Transact.On Syst.,Man and Cybern., vol. 21, No. 5, Sep./Oct. 1991, S.1032-1043; Abstract.S. 1033, S. 1035, Abschn.III, S. 1037, Ii.Sp.

* cited by examiner

*Primary Examiner* — Abdullahi Salad
(74) *Attorney, Agent, or Firm* — RatnerPrestia

(57) ABSTRACT

A method for transmitting measured data from a sensor device to a control device is disclosed. The method is distinguished in that synchronization messages sent by the control device can be received in the sensor device and, on the basis of the reception of synchronization messages, the sensor device is put into a synchronous mode (SM) in which the sensor device sends data messages comprising the measured data to the control device in sync with the reception of the synchronization messages.
A sensor device is also disclosed which is suitable for carrying out the foregoing method.

20 Claims, 6 Drawing Sheets

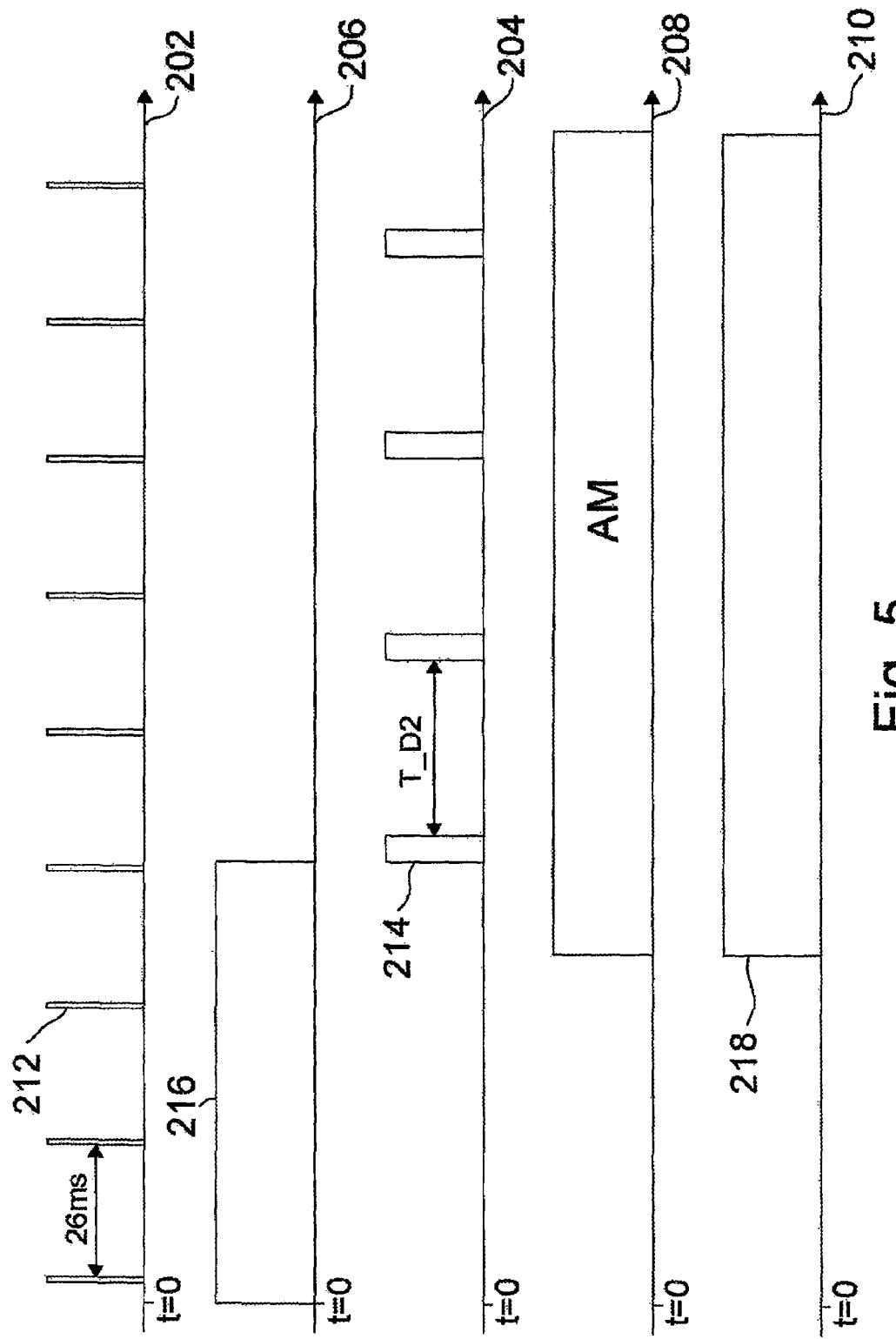

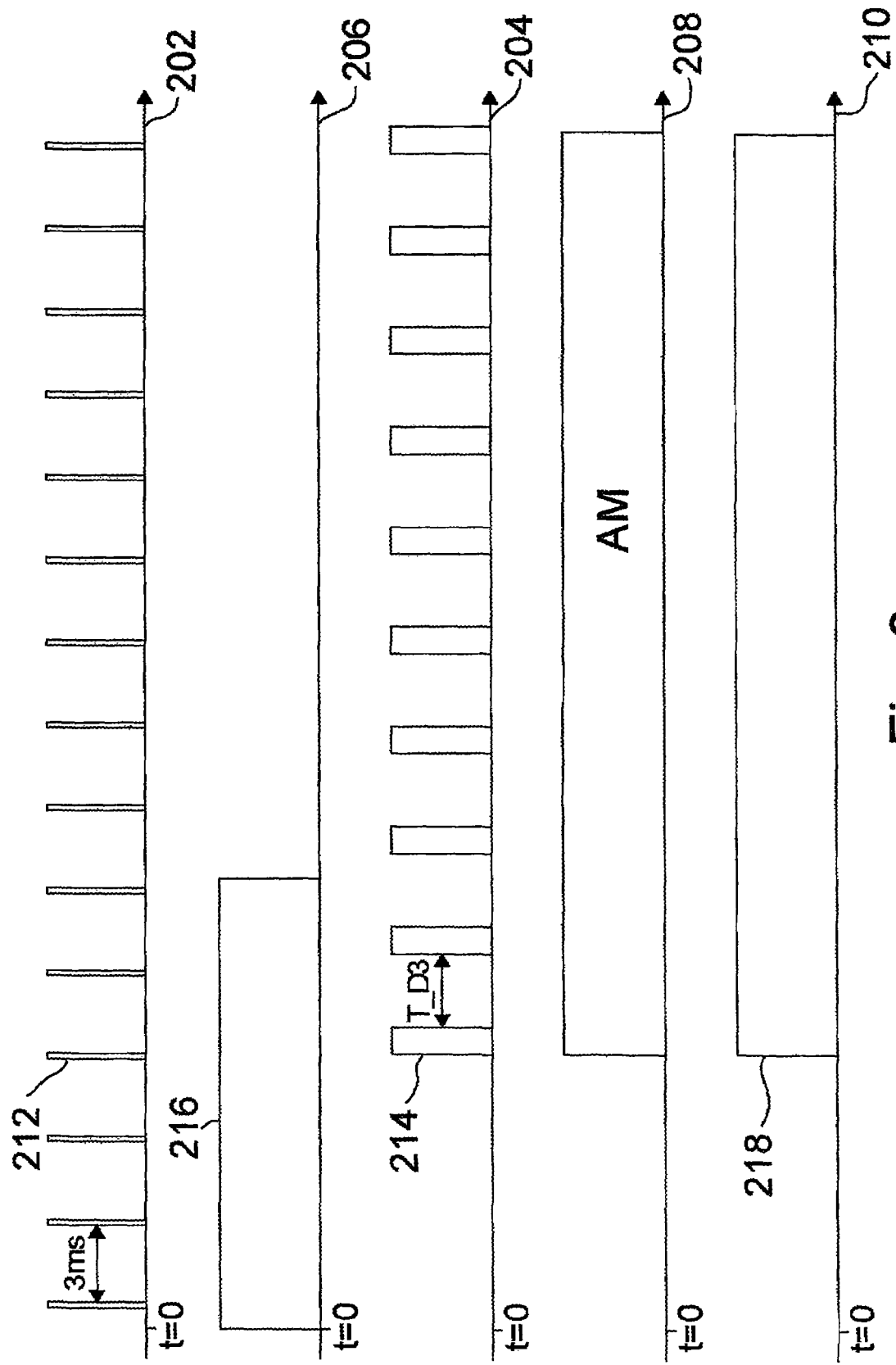

METHOD FOR TRANSMITTING MEASURED DATA, AND SENSOR DEVICE

CROSS REFERENCE TO RELATED APPLICATIONS

This application is the U.S. national phase application of PCT International Application No. PCT/EP2007/055918, filed Jun. 14, 2007, which claims priority to German Patent Application No. DE 102006027997.2, filed Jun. 14, 2006 and German Patent Application No. DE 102007028002.7, filed Jun. 14, 2007, the contents of such applications being incorporated by reference herein.

BACKGROUND OF THE INVENTION

1. Technical Field

The invention relates to a method for transmitting measured data from a sensor device to a control device. The invention also relates to a sensor device which is suitable for carrying out the method. In particular, the invention relates to a sensor device and a control device which are used in a motor vehicle and are connected to one another by means of a data bus.

2. Background to the Invention

Control and regulation functions in motor vehicles are usually performed in control devices which obtain the requisite measured data from one or more sensor devices which are arranged in local isolation from the control device in the motor vehicle. In this arrangement, the measured data are usually transmitted via a data bus, such as the CAN (Controller Area Network) bus which is usually used in motor vehicles.

To perform the control and regulation functions, appropriate algorithms are executed in the control devices, said algorithms being looped. Particularly if the control and regulation functions are safety-critical realtime applications, such as driving dynamics controllers or adaptive speed controllers (ACC for Adaptive Cruise Control), it is necessary for the measured data to be supplied to the control devices such that the measured data available at the start of a loop are as up to date as possible, i.e. that there is the shortest possible time delay between measurement and read-in of the measured data in the control device, which is subsequently called latency.

SUMMARY OF THE INVENTION

It is an object of the present invention to transmit the measured data from a sensor device to a control device via a data bus with as little latency as possible.

Accordingly, the invention provides for a method for transmitting measured data from a sensor device to a control device to be carried out such that synchronization messages sent by the control device can be received in the sensor device and, on the basis of the reception of synchronization messages, the sensor device is put into a synchronous mode in which the sensor device sends data messages comprising the measured data to the control device in sync with the reception of the synchronization messages.

In addition, a sensor device is provided which comprises at least one sensor whose measured data are transmitted to a control device. The sensor device is distinguished in that the sensor device is designed to receive synchronous messages sent by the control device, wherein, on the basis of the reception of synchronization messages, the sensor device can be put into a synchronous mode in which it sends data messages comprising the measured data to the control device in sync with the reception of the synchronization messages.

The sensor device and the control device, which sends the synchronization messages to the sensor device, together preferably form a system which can be used to perform a control and/or regulation function in a motor vehicle. Preferably, the sensor device and the control device are arranged in a motor vehicle in this case.

The invention encompasses the idea that the control device and the sensor device are synchronized to one another using synchronization messages which are sent by the control device. The data messages sent in sync with the reception of the synchronization messages are sent at a fixed interval of time from the reception of the synchronization messages. In particular, a data message can be sent essentially immediately after the reception of a synchronization message.

The synchronization messages can be sent from the control device, for example taking account of the transmission times of the data bus, to the sensor device such that the data messages sent in response to the synchronization messages are received in the control device before the start of a loop.

It is known that delays can occur when transmitting data via a data bus, particularly when transmitting data via the serial CAN bus. This may be the case particularly when there is a high volume of data or a multiplicity of stations need to send data. In this case, there may also be delays in the transmission of the synchronization messages, which means that synchronization of sensor device and control device is sometimes not possible.

Therefore, one embodiment of the method and the sensor device provides for a check to be performed to determine when, particularly at what intervals of time, synchronization messages sent by the control device are received in the sensor device, and for the sensor device to be put into the synchronous mode if the result of the check is that synchronization messages sent by the control device are received in line with a first time pattern.

The advantage of this embodiment is that the data messages are transmitted in the synchronous mode only if the synchronization messages are received in line with a prescribed first time pattern. The time pattern is preferably used to recognize that at most short delays occur in the transmission of the synchronization messages, so that it is possible and makes sense to synchronize sensor device and control device using the synchronization messages.

One refinement of the method and the sensor device is also distinguished in that the first time pattern comprises a minimum number of successive synchronization messages which are received at intervals of time which are respectively within a prescribed first range.

It has been found that such a time pattern can be used to reliably establish that at most short delays occur in the transmission of the synchronization messages and it is possible to perform synchronization between the sensor device and the control device using the synchronization messages.

In addition, one embodiment of the method and of the sensor device provides for the sensor device to be put into an asynchronous mode if the result of the check is that the synchronization messages are not received in the sensor device in line with the first time pattern, wherein in the asynchronous mode the sensor device sends data messages comprising the measured data to the control device at a prescribed frequency.

To be able to transmit measured data to the control device even when synchronization is not possible, this embodiment advantageously provides an asynchronous mode for the transmission of the measured data. The fact that synchronization is not possible is established in this case if the first time pattern is not observed. In the asynchronous mode, the data messages are advantageously transmitted to the control device at a prescribed frequency, i.e. independently of the reception of synchronization messages.

In this case, the term frequency is understood to mean the frequency with which data messages are sent by the sensor device in a particular interval of time, i.e. the repetition rate at which the data messages are sent by the sensor device.

Furthermore, one development of the method and of the sensor device involves the sensor device being put into a first asynchronous mode if the result of the check is that the synchronization messages sent by the control device are received in the sensor device in line with a second time pattern, wherein in the first asynchronous mode data messages comprising the measured data are sent to the control device at a first frequency.

An associated embodiment of the method and of the sensor device is characterized in that the second time pattern comprises a minimum number of successive synchronization messages which are received at intervals of time which are respectively within a prescribed second range, the second range comprising shorter intervals of time than the first range.

Advantageously, the first asynchronous mode is activated, in this refinement, when the synchronization messages are received at relatively short intervals of time. With short intervals of time between the synchronization messages, it can be assumed that the volume of data within the data bus is low, which means that the first frequency can be chosen at an appropriate level without overloading the data bus. The second range may, in particular, comprise all intervals of time which are below the lower limit of the first range.

In addition, one refinement of the method and of the sensor device is distinguished in that the sensor device is put into a second asynchronous mode if the result of the check is that the synchronization messages are not received in the sensor device in line with a prescribed time pattern, wherein in the second asynchronous mode data messages comprising the measured data are sent to the control device at a second frequency.

In this refinement, the second asynchronous mode is advantageously activated when the synchronization messages are not received in the sensor device in line with a prescribed time pattern, particularly not in line with the first or second prescribed pattern. Advantageously, the data messages are in this case transmitted to the control device periodically at a second frequency. The second frequency is preferably lower than the first frequency, since it can be assumed that there are delays in the transmission of the synchronization messages if they do not observe any of the prescribed time patterns. Such delays can occur when there is a high volume of data, which means that a lower frequency is chosen so as not to overload the data bus.

In addition, one refinement of the method and of the sensor device provides for a time window to be prescribed for the check to determine when, particularly at what intervals of time, the synchronization messages sent by the control device are received in the sensor device.

The advantage of this refinement is particularly that the second asynchronous mode is not activated until it is not established within the time window that the synchronization messages are received in line with the prescribed time pattern.

An associated refinement of the method and of the sensor device is characterized in that whenever a synchronization message is received in the sensor device the time window is reinitialized if the sensor device is in the synchronous mode or asynchronous mode.

Preferably, individual modes remain active until the conditions for activation of another mode are met. In this connection, the previously mentioned refinement ensures that a mode, particularly the synchronous mode, remains activated even if the prescribed time pattern is breached only briefly— within the time window. This makes particularly the synchronous mode resilient toward brief deviations from the first time pattern. This also applies in similar fashion to the first asynchronous mode.

In addition, one embodiment of the method and of the sensor device is distinguished in that the check to determine when, particularly at what intervals of time, synchronization messages sent by the control device are received in the sensor device is effected using a timestamp measurement method.

A timestamp measurement method can be used to ascertain particularly reliably at what intervals of time the synchronization messages are received in the sensor device.

In another refinement of the method and of the sensor device, the sensor device and the control device are connected to one another by means of a data bus.

The data bus is, in particular, a data bus in a motor vehicle, for example a CAN bus.

The invention and its embodiments allow resilient synchronization between a sensor device and a control device, which is particularly advantageous especially for safety-critical realtime applications executed in the control unit. One such safety-critical realtime application is particularly driving dynamics control, in which measured driving state data, such as linear accelerations by the vehicle or rotation rates for one or more of the vehicle's axles, are evaluated in order to recognize critical driving states and to stabilize the vehicle by means of control and/or regulation action.

In this context, another embodiment of the method and of the sensor device provides for the sensor device to be a sensor cluster in a motor vehicle which has at least one longitudinal acceleration sensor, particularly a lateral acceleration sensor, and/or at least one rotation rate sensor, particularly a yaw rate sensor.

In a sensor cluster, the sensors which are used to measure the linear accelerations and rotation rates of a vehicle are usually integrated in a housing. Normally, the sensor cluster also contains a processor unit which performs first conditioning of the measured data and produces the data messages which are to be sent to the control device. The sensor cluster is mounted directly in the vehicle, and its design ensures that the sensor modules are accommodated with vibration damping and ensures optimum shielding even from strong electromagnetic fields. To implement driving dynamics control, the sensor cluster usually comprises at least one lateral acceleration sensor and a yaw rate sensor and also preferably a longitudinal acceleration sensor too.

Another embodiment of the method and of the sensor device is characterized in that the control device is a control device in a motor vehicle for performing driving dynamics control.

In addition, a computer program product is provided which comprises software code sections which can be used to carry out a method in accordance with one of the preceding steps when the software code sections are executed on a processor.

The stated and other advantages, peculiarities and expedient refinements of the inventions can also be found in the exemplary embodiments of the invention which are described below with reference to the figures.

BRIEF DESCRIPTION OF THE FIGURES

The invention is best understood from the following detailed description when read in connection with the accompanying drawing. Included in the drawing are the following figures:

FIG. 5 shows a graph illustrating a third example with data transmission in the second asynchronous mode, and FIG. 6 shows a graph illustrating data transmission in a first asynchronous mode by way of example.

DETAILED DESCRIPTION OF EXEMPLARY EMBODIMENTS

Figure 1:
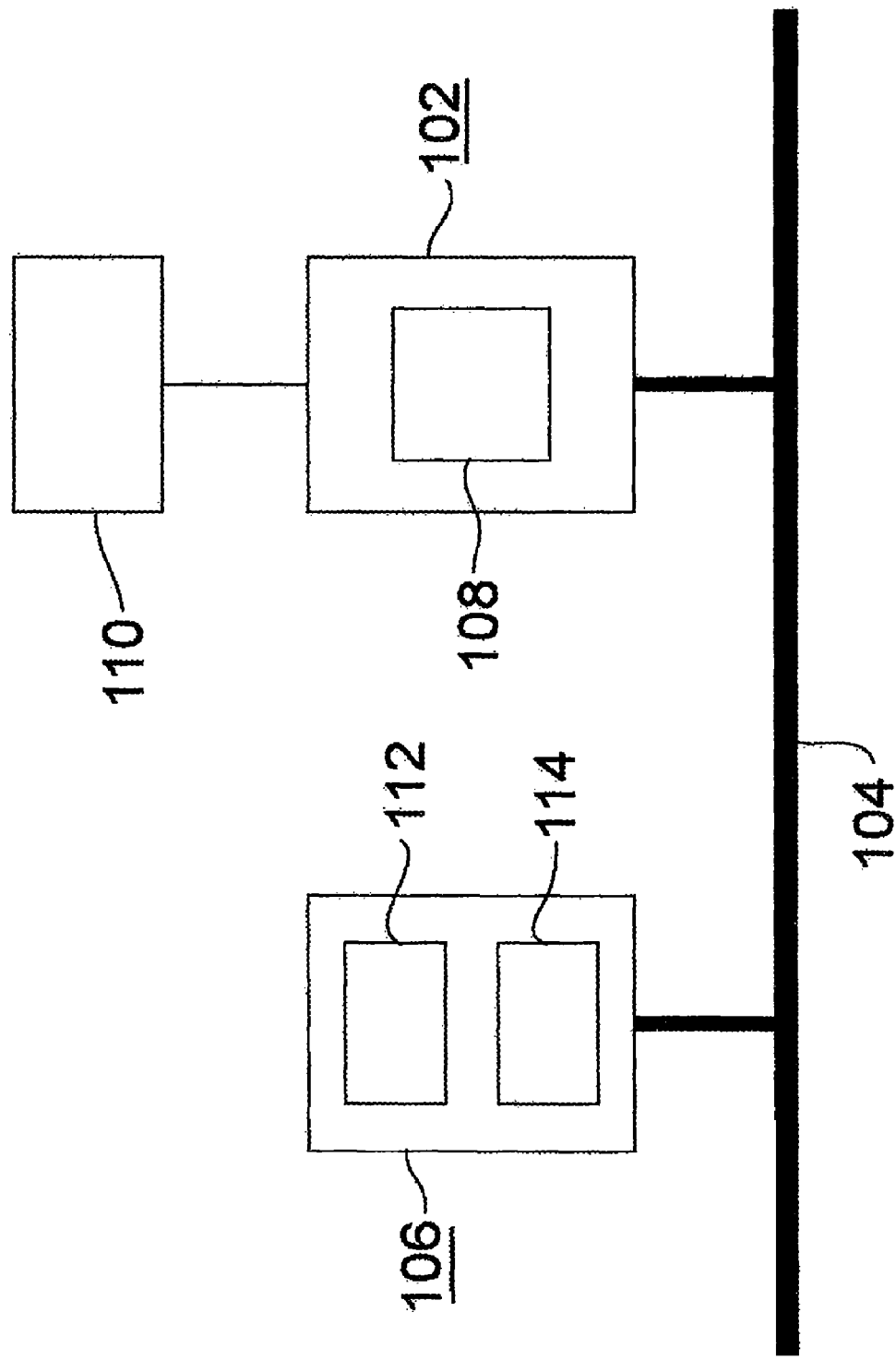
FIG. 1 shows a schematic illustration with a sensor device which is connected to a control device by means of a data bus.

FIG. 1 shows a schematic illustration of a control device (ECU) 102 in a motor vehicle, said control device being connected to a sensor device 106 in the motor vehicle by means of a data bus 104. In one embodiment, the data bus 104 is a CAN bus, which is fundamentally known to a person skilled in the art. The control device 102 has a processor unit 108 for performing a control and/or regulation algorithm, said processor unit being provided in a software program, for example. The control or regulation algorithm produces control commands for actuating at least one actuator 110 which takes action in the operating state of the motor vehicle. In the refinement shown by way of example in FIG. 1, the control device 102 is connected directly to the actuator 110 by means of a data line which is used to transmit the control signals to the actuator 110. However, provision may likewise be made for the control unit to be connected to the actuator 110 by means of the data bus 104. In addition, provision may also be made for the control device 102 to be connected by means of the data bus 104 and/or by means of data lines to a plurality of actuators which are used for providing the functions of the software program.

In one embodiment, the sensor device 106 comprises at least one sensor 112 for detecting a driving state variable or an operating variable for the motor vehicle. However, provision may likewise also be made for the sensor device 106 to comprise a surroundings sensor, for example, for detecting objects in the surroundings of the vehicle. The measured data captured by the sensor 112 are read in by a processor unit 114 and conditioned before they are sent to the control device 102. The measured data are transmitted using messages which are sent to the control device 102 via the data bus 104 in a manner which is known to a person skilled in the art. The messages are likewise generated by the processor unit 114 in the sensor device 106.

The control device 102 processes the measured data cyclically within the executed control and/or regulation algorithm. The duration of a computation cycle is subsequently also called the loop time and is usually approximately 10 ms in the case of driving dynamics control, for example. Likewise, computation cycles can also be interrupted, for example if conditions for entry into control and/or regulation are not met, which means that the actual control and/or regulation algorithm does not need to be executed but rather only the portion of the algorithm in which a check is performed to determine whether entry into the control and/or regulation is required. The interruption in the computation cycles effectively corresponds to a reduction in the loop time. To supply the measured data to the control and/or regulation algorithm with as little latency as possible, attempts are made to synchronize the transmission of the measured data from the sensor device 106 to the control device 102 with the computation cycles of the algorithm. Synchronization is particularly important in this case when the actual control and/or regulation is active, i.e. when control and/or regulation actions are performed by means of the actuator 110. To allow synchronization, the control device 102 sends synchronization messages via the data bus 104 to the sensor device 106, and these are answered with data messages containing measured data in the event of correct reception by the sensor device 106. In this case, the times at which the synchronization messages are sent by the control device 102 are chosen, taking account of the transmission times in the data bus 104, such that the data messages sent by the sensor device 106 are respectively received before the start of a computation cycle in the control device 102. The effect achieved by this is that the processed measured data are as up to date as possible.

For the purpose of sending the data messages containing the measured data, the sensor device 106 has three modes of operation which are subsequently also called directives. The directives are selected by evaluating the chronological order in which the synchronization messages are received. This evaluation is performed continuously while the sensor device 106 is operating, so that it is also possible to change between the directives during operation. To determine the intervals of time between the reception of the synchronization messages, the synchronization messages are processed within the sensor device 106 by the processor unit 114 using a timestamp measurement method.

Directive 1 is initialized when a prescribed minimum number of successive synchronization messages is received whose intervals of time are within a prescribed first range. In this case, the minimum number prescribed is between three and six, preferably four, synchronization messages, for example, and the first range comprises intervals of time between 2 ms and 30 ms, preferably between 4 ms and 25 ms, for example. Hence, directive 1 is preferably initialized upon reception of the fourth synchronization message, provided that the intervals of time between the synchronization messages are between 4 ms and 25 ms. Directive 1 contains the sensor device 106 in a synchronous mode of operation and responds synchronously to the synchronization messages 208 from the control device 102. In this case, the data messages are sent essentially immediately after reception of the synchronization messages, a short time delay arising as a result of the processing time of the sensor device 106 or of the processor unit 114.

If a minimum number of successive synchronization messages and the intervals of time between these synchronization messages are below the lower limit of the first range, directive 3 is initialized. In this case, the minimum number preferably corresponds to the minimum number of synchronization messages which is prescribed in connection with directive 1. Hence, directive 3 is initialized when the fourth synchronization message has been received and the intervals of time between the synchronization messages are shorter than 4 ms. In directive 3, the data messages are transmitted to the control device 102 in an asynchronous mode. In particular, provision is made for the data messages to be sent to the control device 102 at a fixed frequency. By way of example, the fixed frequency is between $\frac{1}{3}$ ms$^{-1}$ and $\frac{1}{8}$ ms$^{-1}$, preferably $\frac{1}{5}$ ms$^{-1}$.

If neither directive 1 nor directive 3 can be initialized within a time window of a prescribed duration, directive 2 is initialized. By way of example, the prescribed duration is between 80 ms and 200 ms, preferably 120 ms. In directive 2, the sensor device 106 is in an asynchronous mode of operation (AM) and sends data messages to the control device 102 at a prescribed frequency 1/T_D2. By way of example, the frequency 1/T_D2 is between $\frac{1}{10}$ ms$^{-1}$ and $\frac{1}{30}$ ms$^{-1}$, preferably 1/20 ms$^{-1}$. The time window is preferably initialized for the first time after the vehicle's ignition has been turned on and the data bus 104 has been fully initialized. While the sensor device 106 is being operated in directive 2, the time window is reinitialized after the prescribed duration has elapsed. If directive 1 or directive 3 is initialized, the time window is reinitialized whenever a synchronization message arrives.

When a directive has been initialized, there is a change to another directive when the conditions for initialization thereof are met. Since the time window for the directives is reinitialized whenever a synchronization message arrives, the directives continue to be initialized even when no synchronization messages are received in the sensor device 106, or synchronization messages are not received correctly, within the time window. If, for example, the synchronization messages are received at intervals of time of 10 ms when directive 1 is initialized, and the time window of 120 ms is prescribed, then directive 1 continues to be initialized even when up to 11 synchronization messages are omitted. This makes the communication between the sensor device 106 and the control device 102 resilient toward errors in the transmission of the synchronization messages.

The previously stated conditions for the initialization of directive 2 may arise, by way of example, when the transmission times for the synchronization messages vary on account of a high volume of data within the data bus 104, which is also called Jitter. Accordingly, the frequency at which data messages are sent to the control device 102 in directive 2 is proportioned such that it is firstly sufficiently high to provide measured data which are sufficiently up to date, and secondly the volume of data on the data bus 104 is not increased too greatly. The conditions for initialization of directive 3 can arise when previous delays in the data transmission mean that successive synchronization messages are initially "piled up" and are then received in the sensor device 106 in very quick succession or when the computation cycles in the control device 102 are terminated, as described previously, so that effectively a shorter loop time is obtained. In such situations, it is expedient to send the data messages to the control device 102 at a relatively high frequency, since the high reception rate means that a low volume of data in the data bus 104 can be assumed and a frequency of the data messages can ensure that even without synchronization between the sensor device 106 and the control device 102 there are always sufficiently up-to-date measured data at the start of a computation cycle in the control device 102. Synchronization between the sensor device 106 and the control device 102 is not absolutely necessary when the loop time is shortened considerably, and it is not performed, particularly so as not to overload the data bus 104 with a very large number of data messages which are sent at a very high frequency.

To signal whether the data transmission is taking place in the synchronous mode, i.e. in directive 1, or in an asynchronous mode, i.e. in directive 2 or 3, the sensor device 106 generates a transmission status which assumes the value zero for synchronous data transmission and assumes a value other than zero for asynchronous data transmission. The transmission status is transmitted to the control device 102 via the data bus 104 within the data messages or separately therefrom. Depending on the status, it is then possible for processes, for example, to be customized in the control device 102 when asynchronous data transmission is taking place. This means that a control and/or regulation algorithm executed in the control device 102 can be customized such that incorrect actuation of the actuator 110 is avoided, which may be caused by impairments in the transmission of the measured data.

The data transmission in the directives described is illustrated using a few schematic examples in FIGS. 2 to 7 with the aid of graphs. The graphs contain a time axis 202, which illustrates the reception of synchronization messages 212 in the sensor device 106, and a time axis 204, which illustrates the sending of data messages 214 by the sensor device 106. A further time axis 206 illustrates the time window 216, which is initialized after the start of ignition and the initialization of the data bus 104 at the time t=0. In addition, the graphs contain a time axis 208, which is used to illustrate whether the data transmission is taking place in the synchronous mode (SM) or in an asynchronous mode (AM), and also a time axis 210, which indicates the value of the transmission status error signal 218 which is output by the sensor device 106.

It is subsequently assumed that the prescribed first range comprises intervals of time between 4 ms and 25 ms, and the minimum number of synchronization messages is four.

Figure 2:
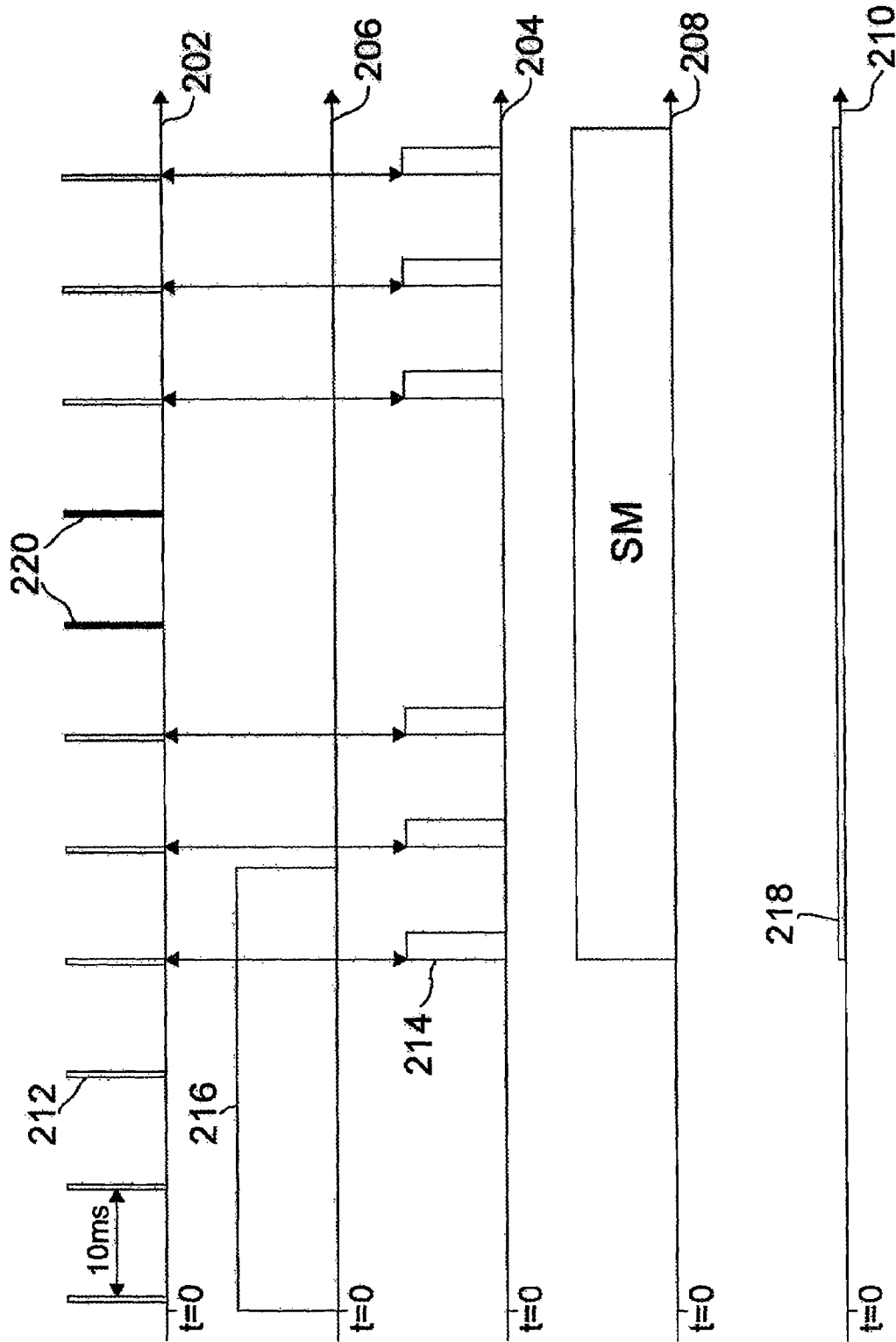
FIG. 2 shows a graph illustrating data transmission in a synchronous mode by way of example.

FIG. 2 shows a situation in which the synchronization messages 212 are received in the sensor device 106 at intervals of time of 10 ms. With a loop time of 10 ms, this is the case, by way of example, when the synchronization messages 212 can be transmitted via the data bus 104 without Jitter effects. The intervals of time of 10 ms are in the prescribed first range. Hence, when the fourth synchronization message 212 is received, directive 1 is initialized and the sensor device 106 responds to the synchronization messages 212, starting with the fourth synchronization message 212, in sync with the transmission of data messages 214. As can be seen in FIG. 2, in this case the sensor device 106 sends a data message 214 to the control device 102 essentially immediately after the reception of a synchronization message 212.

In addition, FIG. 2 shows, by way of example, two synchronization messages 220 which are not received in the sensor device 106 correctly. As can be seen in FIG. 2, the sensor device 106 remains in the synchronous mode even if the synchronization messages 220 are omitted, which means that it responds to the next correctly received synchronization message 212 in sync with a data message yet again.

Examples of data transmission in directive 2 are given in FIGS. 3 to 5 and are explained below.

Figure 3:
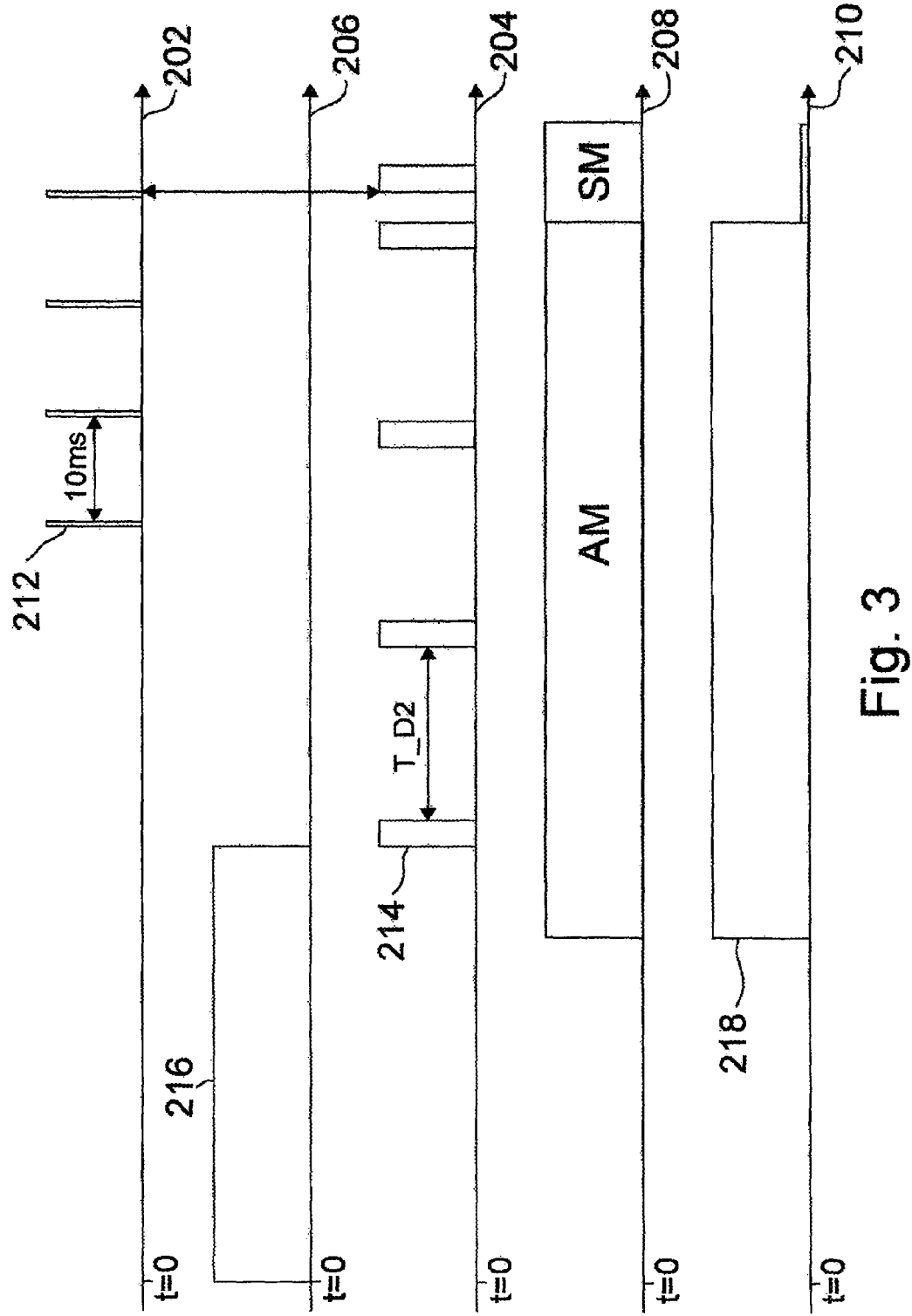
FIG. 3 shows a graph illustrating a first example with data transmission in a second asynchronous mode.

FIG. 3 relates to a situation in which, following the ignition restart and the initialization of the data bus 104, no synchronization messages 212 are received in the sensor device 106. Therefore, at the end of the time window 216 initialized at the start of ignition, directive 2 is initialized and data messages 214 are sent to the control device 102 at a fixed interval of time T_D2 in the asynchronous mode (AM). This ensures that measured data are present in the control device 102 even if the transmission of synchronization messages 212 fails. The status 218 illustrated by means of the time axis 210 has a value other than zero while directive 2 is initialized, in order to signal to the control device 102 that the synchronization error is present.

In the situation shown, synchronization takes place at a later time, after the sensor device 106 has received four synchronization messages 212 at a fixed interval of time of 10 ms. When the fourth synchronization message 212 is received, directive 1 is therefore initialized, and the data transmission takes place in the synchronous mode (SM). The transmission status 218 then assumes the value zero.

Figure 4:
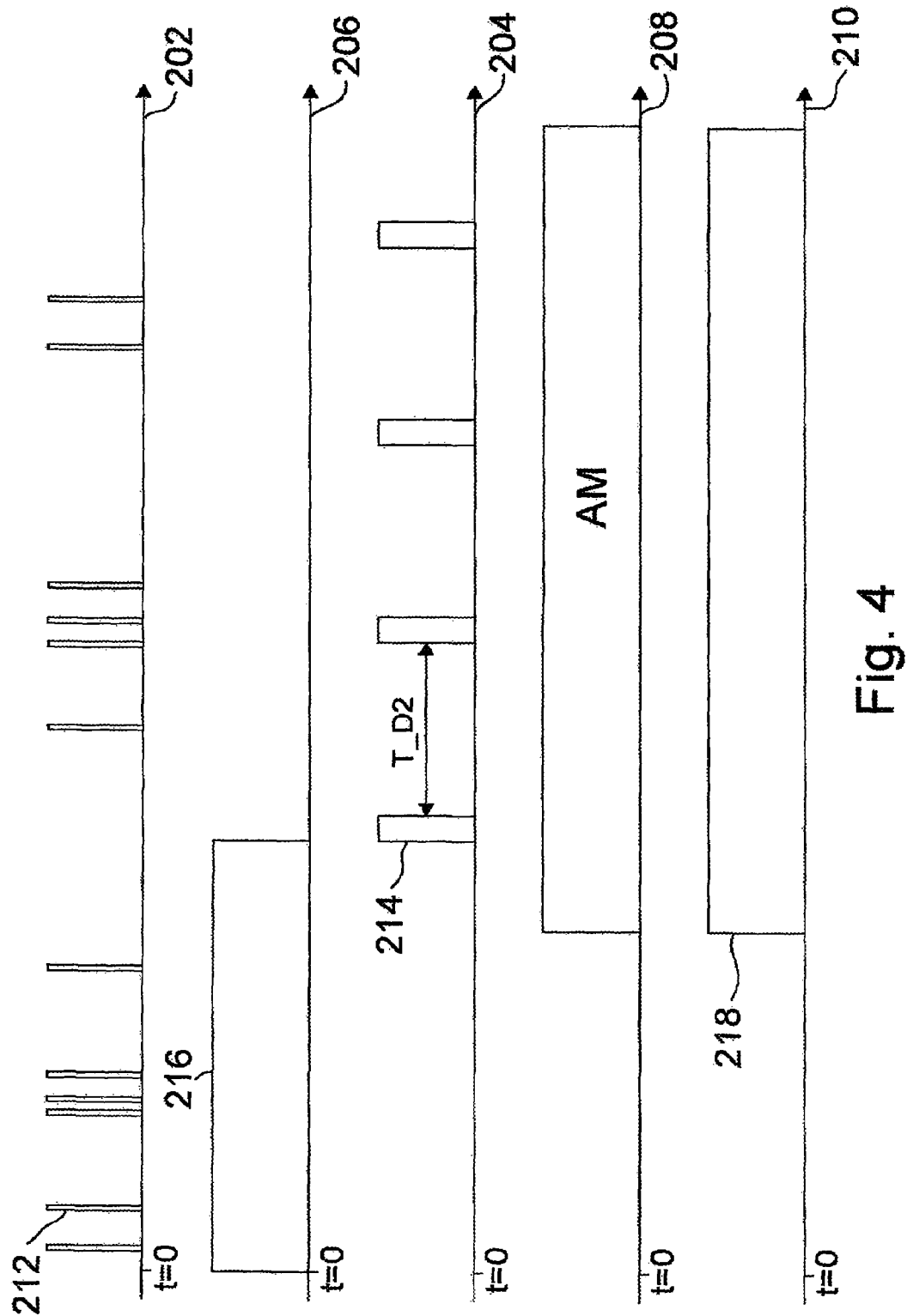
FIG. 4 shows a graph illustrating a second example with data transmission in the second asynchronous mode.

In the situation shown in FIG. 4, the synchronization messages 212 from the control device 102 are received in the sensor device 106 at irregular intervals of time and do not have a time pattern in which the intervals of time between a minimum number of successive synchronization messages are in the range provided for the initialization of directive 1 or in the range provided for the initialization of directive 3, so that directives 1 and 3 cannot be initialized within the time window 216 shown. In this case, at the end of the time window 216 shown, which is initialized at the start of ignition, directive 2 is initialized and data messages 214 are sent to the control device 102 at fixed intervals of time T_D2 in an asynchronous mode (AM). This ensures that message data are in the control device 102 even if the transmission of synchronization messages 212 fails. The error signal 218 illustrated by means of the time axis 210 has a value other than zero in order to signal to the control device 102 that the synchronization error is present.

FIG. 5 shows a situation in which synchronization messages 212 are received in the sensor device 106 at regular intervals of time of 26 ms. However, this interval of time is above the upper limit of the prescribed first range, which in this case is 25 ms, for example. Therefore, at the end of the time window 216 shown, which is initialized at the ignition restart, directive 2 is initialized and the data transmission takes place in an asynchronous mode (AM), wherein the data messages 214 are transmitted to the control device 102 at fixed intervals of time T_D2. In this case, the transmission status 218 assumes a value other than zero in order to signal the synchronization error.

FIG. 6 relates to a situation in which the synchronization messages 212 are received in the sensor device 106 at intervals of time of 3 ms. This interval of time is below the lower limit of the prescribed first range, which means that directive 3 is initialized when the fourth synchronization message 212 is received. Hence, the data transmission takes place in an asynchronous mode (AM), wherein the data messages 214 are sent from the sensor device 106 to the control device 102 at fixed intervals of time T_D3. In this case, the transmission status 218 likewise assumes a value other than zero in order to signal to the control device 102 that the synchronization error is present.

The synchronization concept proposed as part of the invention and explained by way of example above is particularly suitable when the control device 102 is executing safety-critical realtime applications which involve the use of measured data captured by means of the sensor device 106. An example of one such safety-critical realtime application is driving dynamics control, particularly ESP (Electronic Stability Program) control, which is known per se to a person skilled in the art, which is an instance of application of the present invention. In this instance of application, the sensor device 106 is in the form of a sensor cluster, for example, which comprises sensors for detecting driving state variables. In this case, the sensor cluster accommodates at least one lateral acceleration sensor and a yaw rate sensor. Equally, the sensor cluster may also contain a longitudinal acceleration sensor and/or further rotation rate sensors and/or one or more rotation acceleration sensors. The control device 102 executes a control and/or regulation algorithm for performing the driving dynamics regulation by using the measured data transmitted by the sensor cluster in order to assess the current driving situation of the vehicle and to perform control and regulation actions to stabilize the vehicle in critical driving situations. In the case of such driving dynamics control, the actuators 110 used for performing the control and regulation actions are, by way of example, a brake actuator, which can be used to set individual braking forces on the wheels of the vehicle independently of the driver, and possibly a steering actuator, which can be used to set the steer angle of the steerable wheels of the vehicle independently of the driver. Furthermore, provision may be made for the control unit also to be used to actuate a drive motor in the vehicle in order to stabilize the driving state of the vehicle.

The application of the invention and of its embodiments is not limited to driving dynamics controllers in any way, however. Rather, the proposed synchronization concept can also be used for other applications, particularly for safety-critical realtime applications. Examples of other such applications are adaptive speed controllers, which customize the speed of the vehicle on the basis of a distance between the motor vehicle and objects in the surroundings of the motor vehicle, or safety systems known per se to a person skilled in the art which actuate active and/or passive safety means in the vehicle when there is the threat of a collision between the vehicle and an object in the surroundings of the vehicle. In both of the latter applications, sensor devices 106 are used which contain surroundings sensors for detecting objects in the surroundings of the vehicle and, using the proposed synchronization concept, can be synchronized with a control device 102 for performing the stated functions.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for transmitting measured data from a sensor device to a control device, wherein synchronization messages sent by the control device are received in the sensor device and, on the basis of the reception of synchronization messages, the sensor device is put into a synchronous mode (SM) in which the sensor device sends data messages comprising the measured data to the control device in sync with the reception of the synchronization messages, wherein a check is performed to determine when synchronization messages sent by the control device are received in the sensor device, and the sensor device is put into the synchronous mode (SM) if the result of the check is that synchronization messages sent by the control device are received in line with a first time pattern, and wherein the sensor device is put into an asynchronous mode (AM) if the result of the check is that the synchronization messages are not received in the sensor device in line with the first time pattern, wherein in the asynchronous mode (AM) the sensor device sends data messages comprising the measured data to the control device at a prescribed frequency.

2. The method as claimed in claim 1 wherein a check is performed to determine at what intervals of time synchronization messages sent by the control device are received in the sensor device.

3. The method as claimed in claim 1, wherein the first time pattern comprises a minimum number of successive synchronization messages which are received at intervals of time which are respectively within a prescribed first range.

4. The method as claimed in claim 1, wherein the sensor device is put into a first asynchronous mode if the result of the check is that the synchronization messages sent by the control device are received in the sensor device in line with a second time pattern, wherein in the first asynchronous mode data messages comprising the measured data are sent to the control device at a first frequency.

5. The method as claimed in claim 4, wherein the second time pattern comprises a minimum number of successive synchronization messages which are received at intervals of time which are respectively within a prescribed second range, the second range comprising shorter intervals of time than the first range.

6. The method as claimed in claim 1, wherein the sensor device is put into a second asynchronous mode if the result of the check is that the synchronization messages are not received in the sensor device in line with a prescribed time pattern, wherein in the second asynchronous mode data messages comprising the measured data are sent to the control device at a second frequency.

7. The method as claimed in claim 6, wherein the sensor device is put into a second asynchronous mode if the result of the check is that the synchronization messages are not received in the sensor device in line the first or second prescribed pattern.

8. The method as claimed in claim 1, wherein a time window is prescribed for the check to determine when the synchronization messages sent by the control device are received in the sensor device.

9. The method as claimed in claim 8, wherein the time window is prescribed for the check to determine at what intervals of time the synchronization messages sent by the control device are received in the sensor device.

10. The method as claimed in claim 8, wherein whenever a synchronization message is received in the sensor device the time window is reinitialized if the sensor device is in the synchronous mode (SM) or asynchronous mode.

11. The method as claimed in claim 1, wherein the check to determine when synchronization messages sent by the control device are received in the sensor device is effected using a timestamp measurement method.

12. The method as claimed in claim 11, wherein the check to determine at what intervals of time synchronization messages sent by the control device are received in the sensor device is effected using a timestamp measurement method particularly.

13. The method as claimed in claim 1, wherein the sensor device and the control device are connected to one another by means of a data bus.

14. The method as claimed in claim 1, wherein the sensor device is a sensor cluster in a motor vehicle which has at least one longitudinal acceleration sensor, at least one rotation rate sensor, or both at least one longitudinal acceleration sensor and at least one rotation rate sensor.

15. The method as claimed in claim 14, wherein the at least one longitudinal acceleration sensor is a lateral acceleration sensor.

16. The method as claimed in claim 14, wherein the at least one rotation rate sensor is a yaw rate sensor.

17. The method as claimed in claim 1, wherein the control device is a control device in a motor vehicle for performing driving dynamics control.

18. A computer program product stored on Non-transitory computer readable medium comprising software code sections which are used to carry out a method in accordance with claim 1 when the software code sections are executed on a processor.

19. A sensor device comprising at least one sensor whose measured data are transmitted to a control device, wherein the sensor device is configured to receive synchronization messages sent by the control device, wherein, on the basis of the reception of synchronization messages, the sensor device is configured to be put into a synchronous mode (SM) in which the sensor device sends data messages comprising the measured data to the control device in sync with the reception of the synchronization messages,
wherein the sensor device is configured to perform a check to determine when synchronization messages sent by the control device are received in the sensor device, and the sensor device is put into the synchronous mode (SM) if the result of the check is that synchronization messages sent by the control device are received in line with a first time pattern, and wherein the sensor device is put into an asynchronous mode (AM) if the result of the check is that the synchronization messages are not received in the sensor device in line with the first time pattern, wherein in the asynchronous mode (AM) the sensor device sends data messages comprising the measured data to the control device at a prescribed frequency.

20. A method for transmitting measured data from a sensor device to a control device comprising the steps of:
transmitting synchronization messages via the control device;
receiving the synchronization messages at the sensor device;
operating the sensor device in a synchronous mode (SM), on the basis of the reception of synchronization messages, wherein in the synchronous mode (SM) the sensor device transmits data messages comprising the measured data to the control device in sync with the reception of the synchronization messages that are transmitted by the control device, and
wherein a check is performed to determine when synchronization messages sent by the control device are received in the sensor device, and the sensor device is put into the synchronous mode (SM) if the result of the check is that synchronization messages sent by the control device are received in line with a first time pattern, and wherein the sensor device is put into an asynchronous mode (AM) if the result of the check is that the synchronization messages are not received in the sensor device in line with the first time pattern, wherein in the asynchronous mode (AM) the sensor device sends data messages comprising the measured data to the control device at a prescribed frequency.

* * * * *